(12) United States Patent
Chou et al.

(10) Patent No.: US 9,256,300 B2
(45) Date of Patent: Feb. 9, 2016

(54) REMOTE CONTROLLER WITH TOUCH PANEL

(71) Applicant: TIANJIN FUNAYUANCHUANG TECHNOLOGY CO.,LTD., Tianjin (CN)

(72) Inventors: Shih-Chin Chou, New Taipei (TW); Ya-Fen Tsai, New Taipei (TW)

(73) Assignee: TIANJIN FUNAYUANCHUANG TECHNOLOGY CO., LTD., Tianjin (CN)

( * ) Notice: Subject to any disclaimer, the term of this patent is extended or adjusted under 35 U.S.C. 154(b) by 53 days.

(21) Appl. No.: 14/157,516

(22) Filed: Jan. 16, 2014

(65) Prior Publication Data

US 2015/0029109 A1    Jan. 29, 2015

(30) Foreign Application Priority Data

Jul. 26, 2013  (CN) .......................... 2013 1 03186281

(51) Int. Cl.
  *G06F 3/041* (2006.01)
  *G06F 3/0346* (2013.01)
  *G06F 3/044* (2006.01)
  *G06F 3/047* (2006.01)
  *G06F 3/0354* (2013.01)
  *H04N 5/44* (2011.01)

(52) U.S. Cl.
  CPC .......... *G06F 3/0346* (2013.01); *G06F 3/03543* (2013.01); *G06F 3/03547* (2013.01); *G06F 3/044* (2013.01); *G06F 3/047* (2013.01); *H04N 5/4403* (2013.01); *G06F 2203/04102* (2013.01); *G06F 2203/04112* (2013.01); *H04N 2005/443* (2013.01)

(58) Field of Classification Search
  CPC .......................... G06F 3/041; G02F 1/133338
  See application file for complete search history.

(56) References Cited

U.S. PATENT DOCUMENTS

2011/0043447 A1 * 2/2011 Inaba et al. ................... 345/157
2013/0141356 A1   6/2013 Shih et al.
2014/0320756 A1 * 10/2014 Shih et al. ...................... 349/12

FOREIGN PATENT DOCUMENTS

TW           201324266        6/2013
TW           M455913          6/2013

* cited by examiner

*Primary Examiner* — Tony N Ngo
(74) *Attorney, Agent, or Firm* — Novak Druce Connolly Bove + Quigg LLP

(57) ABSTRACT

A remote controller with touch panel comprises a case, a circuit board, a power supply, and signal emitter. The circuit board, the power supply, and the signal emitter are accommodated in the case. The touch panel comprises a cover lens, and a carbon nanotube film is located on an inner surface of the cover lens. A number of touching and sensing electrodes are electrically connected to the carbon nanotube to supply signals. The carbon nanotube film comprises a plurality of carbon nanotubes oriented along the same direction.

19 Claims, 11 Drawing Sheets

REMOTE CONTROLLER WITH TOUCH PANEL

CROSS-REFERENCE TO RELATED APPLICATIONS

This application claims all benefits accruing under 35 U.S.C. §119 from China Patent Application No. 201310318628.1, filed on Jul. 26, 2013, in the China Intellectual Property Office, the disclosure of which is incorporated herein by reference.

BACKGROUND

1. Technical Field

The present disclosure relates to remote controllers, particularly to a remote controller with touch sensing capability.

2. Description of Related Art

In recent years, digital televisions with digital set-top boxes have been developed. The digital TVs can be associated with a network via digital set-top boxes.

Through the digital set-top boxes, the digital TV may not only play and change channels, but may also share resources on the network. Users can do much more with the digital TV with digital set-top boxes than with a traditional TV, such as shopping, reading news. With the development of digital TVs, control devices with various functions have accordingly developed. The control devices may function as mice and keyboards to control the digital TVs. However, the structures of the control devices may be complex. Thus the control devices may not be user friendly.

What is needed, therefore, is to provide a remote controller for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
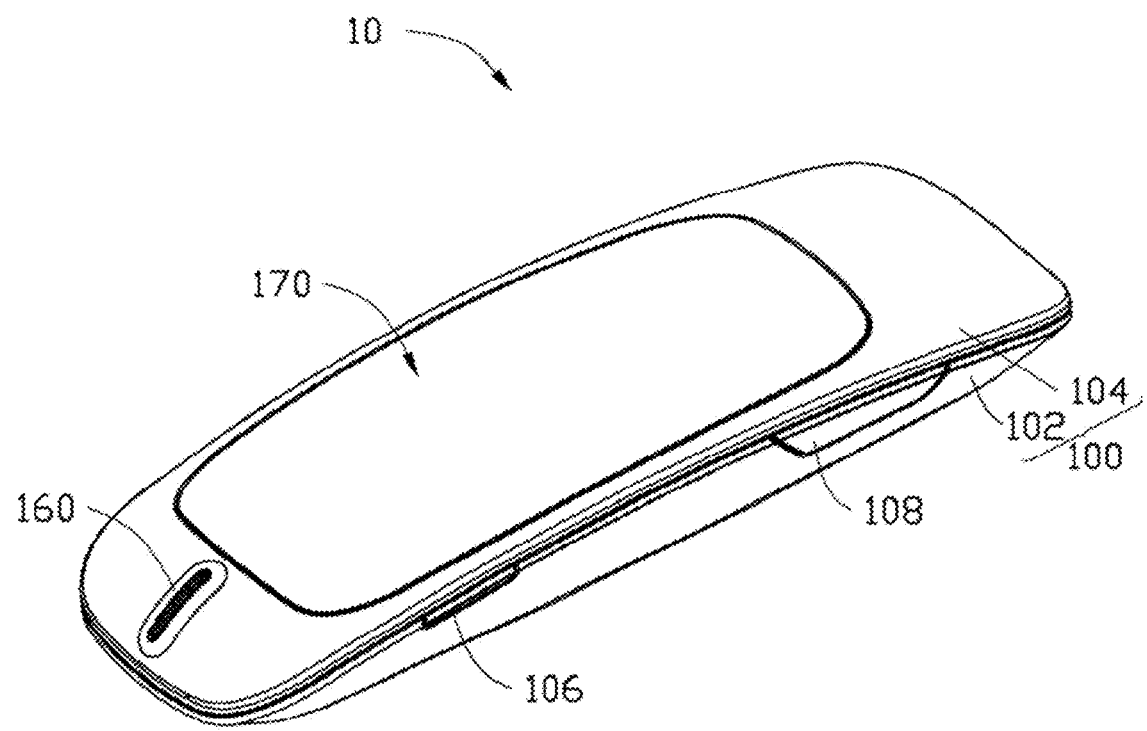
FIG. 1 is a schematic stereographic view of an embodiment of a remote controller.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1 to FIG. 4, one embodiment of a remote controller 10 comprises a case 100, a touch panel 170, a circuit board 120, a signal emitter 130, and a power supply 140. The touch panel 170 comprises a touch sensor 110 and a cover lens 150. The cover lens 150 covers the touch sensor 110. The touch sensor 110, the circuit board 120, the signal emitter 130, the power supply 140 are accommodated in the case 100.

The case 100 comprises a lower case 102 and an upper case 104 coupled with the lower case 102. The upper case 104 comprises a curved surface 1041. The lower case 102 and the upper case 104 have certain hardness. The material of the lower case 102 and case 104 can be insulated material such as glasses, ceramic, or plastic.

The lower case 102 and the upper case 104 can be transparent or opaque. The upper case 104 can be a curved structure with two opposite curved surfaces 1041. In one embodiment, a thickness of the upper case 104 is uniform. Both the two opposite curved surfaces 1041 can be curve and surface, such as second-degree surface or a free-form surface. The curve and surface can be formed by rotating a first curve around a symmetry axis of the first curve, or moving the first curve along the second curve. The first curve is defined as a ruling or a generatrix of the curve and surface. In one embodiment, the material of the low base 102 and the up base 104 is polyvinyl chloride (PVC). Furthermore, a switch 106 and a Universal Serial Bus (USB) port 108 can be located on a side surface of the lower case 102.

Figure 2:
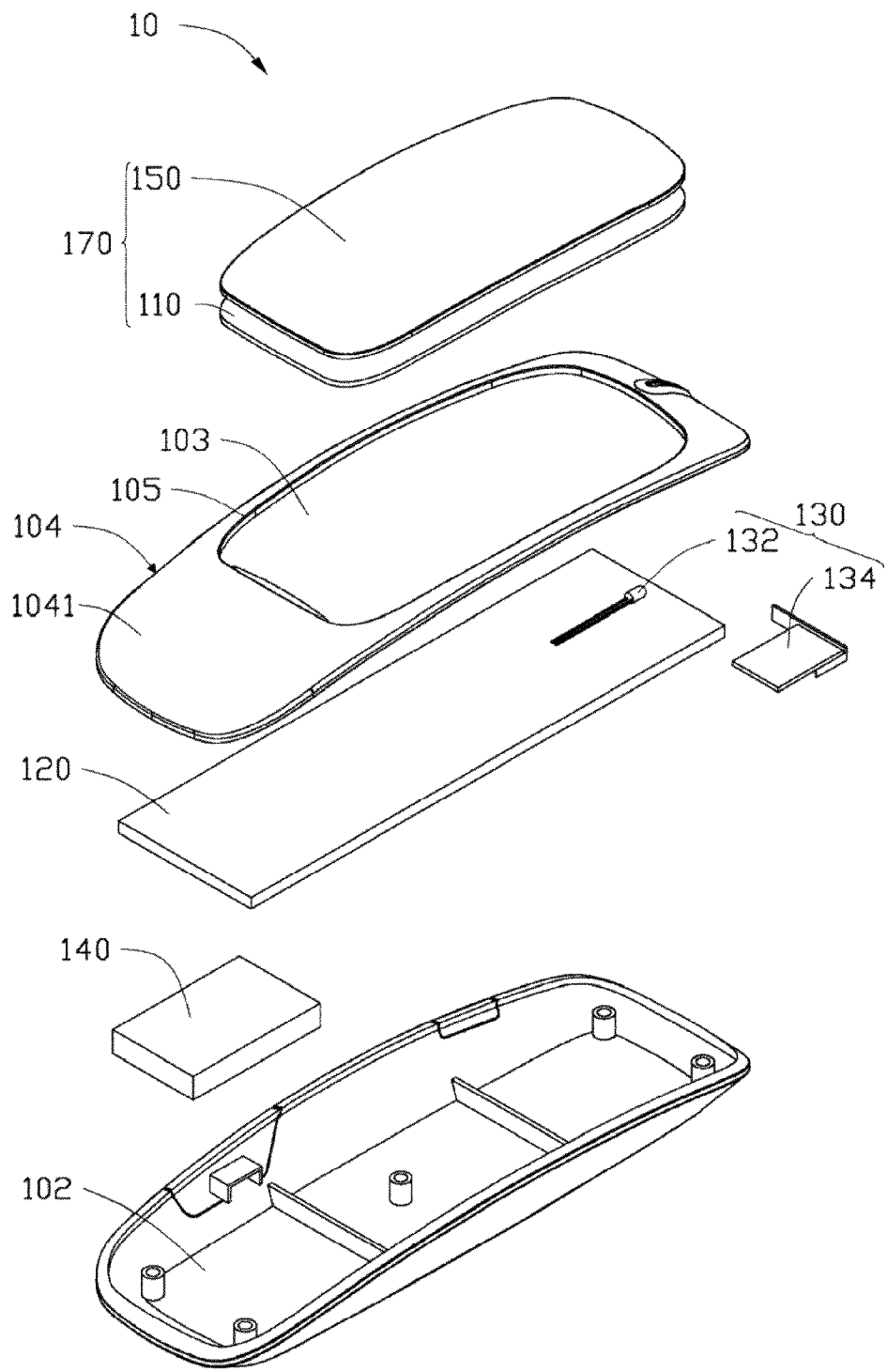
FIG. 2 is a schematic exploded view of the remote controller of FIG. 1.
Figure 3:
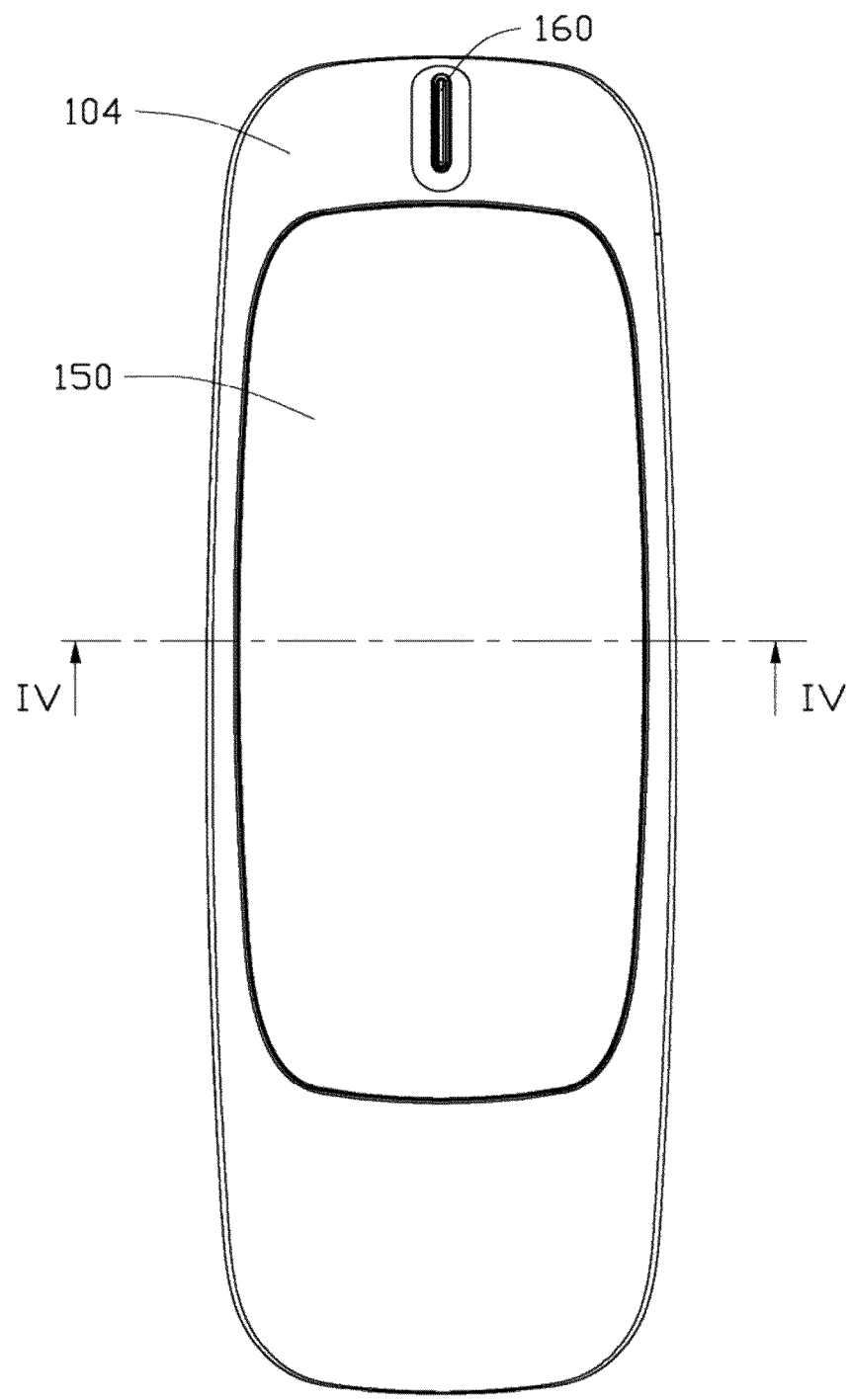
FIG. 3 shows a schematic top view of the remote controller of FIG. 1.

Referring to FIG. 2, a cavity 103 is defined in the upper case 104. The touch sensor 110 is embedded and fixed in the cavity 103. The shape and size of the cavity 103 is coupled with the shape and size of the touch sensor 110 such that the touch sensor 110 can be firmly fixed in the cavity 103. Furthermore, the cover lens 150 can be fixed in the cavity 103 and covers the touch sensor 110. The cover lens 150 and the touch sensor 110 are functioned as the touch panel 170 and capable of sensing touch point and being detached from the cavity 103. A depth of the cavity 103 can be greater than a total thickness of the cover lens 150 and the touch sensor 110. Furthermore, a gap 105 can be defined at an edge of the cavity 103, and the touch sensor 110 can be electrically connected to the circuit board via conductive wires through the gap 105.

It can be understood that, the cavity 103 can also be defined on the inner surface of the upper case 104. Furthermore, the cavity 103 can also be omitted from the upper case 104. Thus cover lens 150 can be integrated with the upper case 104. The touch sensor 110 is attached on the inner surface of the upper case 104. In one embodiment, the cavity 103 and the cover lens 150 is in a shape of rectangle with fourth curved edges.

The cover lens 150 is a curved structure with uniformly thickness. The cover lens 150 has an arc cross section and comprises a curved surface, furthermore, the cover lens 150 can also be a curve and surface, and two opposite surface of the cover lens 150 is shaped in curved surface. The material of the cover lens 150 can be same as the material of the upper case 104. In one embodiment, the material of the cover lens 150 is polyvinyl chloride (PVC).

Figure 4:
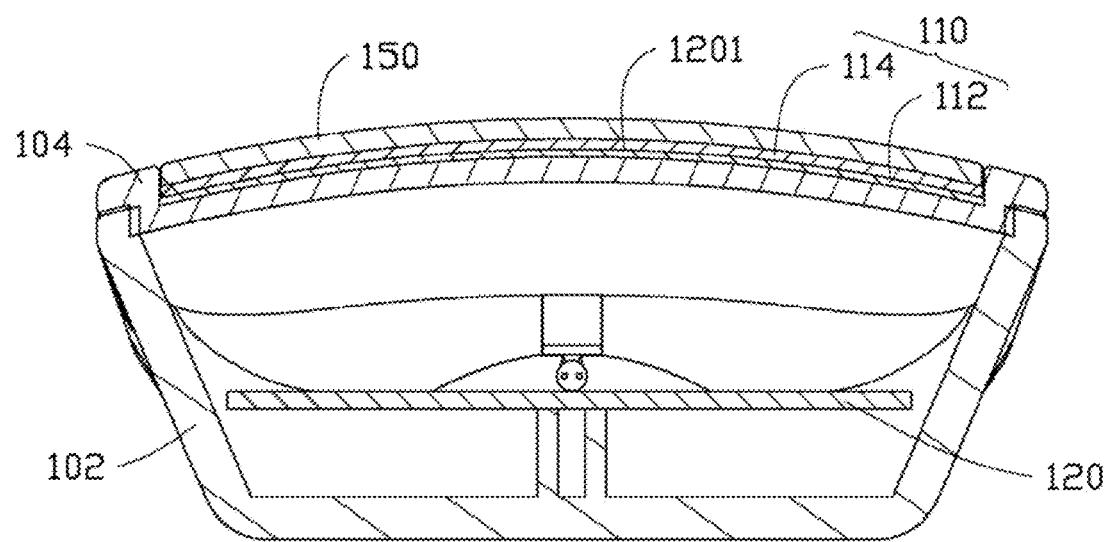
FIG. 4 shows a cross-section view of the remote controller along line IV-IV.
Figure 5:
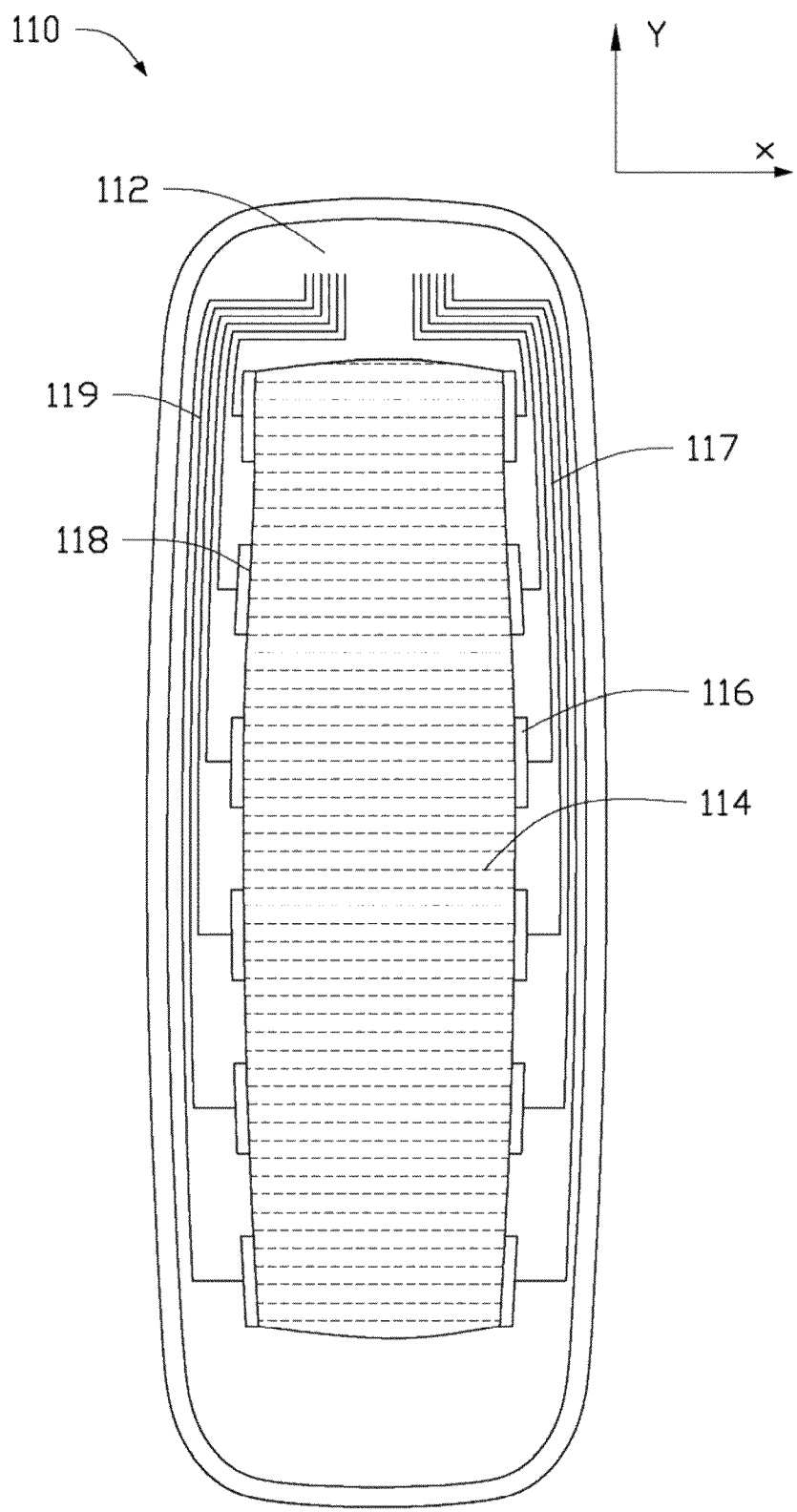
FIG. 5 shows a schematic view of one embodiment of a touch sensor of the remote controller of FIG. 1.

Referring to FIGS. 4-5, the touch sensor 110 comprises a substrate 112, a carbon nanotube film 114, a plurality of first electrodes 116, a plurality of first conductive wires 117, a plurality of second electrodes 118, and a plurality of second conductive wires 119. The substrate 112 is a curved structure with a curved surface 1121. The carbon nanotube film 114 is attached on the curved surface 1121. The size of the carbon nanotube film 114 can be smaller than the size of the curved surface 1121. The curved surface 1121 can be functionally divided into a first region and a second region around the first region. The carbon nanotube film 114 is completely attached on the first region of the curved surface 1121. The second region of the substrate 112 which is not covered by the carbon nanotube film is configured to distribute the plurality of first electrodes 116, the plurality of second electrodes 118, the plurality of first conductive wires 117, and the plurality of second conductive wires 119. The plurality of first electrodes 116, the plurality of first conductive wires 117, the plurality of second electrodes 118, and the plurality of second conductive wires 119 are distributed on the second region.

The substrate 112 is used to support and protect the carbon nanotube film 114, the plurality of first electrodes 116, the plurality of second electrodes 118, the plurality of first conductive wires 117, and the plurality of second conductive wires 119. The curved surface 1121 of the substrate 112 can be coupled with the cover lens 150. A thickness of the substrate 112 ranges from about 100 micrometers to about 500 micrometers. The substrate 112 can be flexible or hard. The material of the substrate 112 can be polycarbonate (PC), polymethyl methacrylate (PMMA), polyethylene (PE), polyimide (PI) or polyethylene terephthalate (PET) and other polyester materials, or poly ether sulfone (PES), cellulose esters, polyvinyl chloride (PVC), benzocyclobutene (BCB) or acrylic resin. In one embodiment, the material of the substrate 112 is polyethylene terephthalate.

The carbon nanotube film 114 can be directly attached on the curved surface 1121 of the substrate 112, and sandwiched between the cover lens 150 and the substrate 112. The carbon nanotube film 114 can an anisotropic impedance layer with a relatively high impedance direction H and a relatively low impedance direction D respectively. The electrical conductivity of the carbon nanotube film 114 on the relatively low impedance direction D is larger than the electrical conductivities of the carbon nanotube film 114 in other directions. The relatively high impedance direction H is different from the relatively low impedance direction D. In one embodiment, the relatively high impedance direction H is perpendicular to the relatively low impedance direction D. The relative low impedance direction D can be defined as the X direction, and the relative high impedance direction H can be defined as Y direction Referring to FIG. 6, the carbon nanotube film 114 can be a free-standing structure. The carbon nanotube film 114 comprises a plurality of carbon nanotubes oriented along a preferred orientation, meaning that a large number of the carbon nanotubes in the carbon nanotube drawn film are arranged substantially along the same direction. The plurality of carbon nanotubes are parallel with the surface of the carbon nanotube film 114. An end of one carbon nanotube is joined to another end of an adjacent carbon nanotube arranged substantially along the same direction, by Van der Waals attractive force. A small number of the carbon nanotubes may be randomly arranged in the carbon nanotube film 114, and has a small if not negligible effect on the larger number of the carbon nanotubes in the carbon nanotube film 114 arranged substantially along the same direction. The carbon nanotube film 114 is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube film 114 is placed between two separate supporters, a portion of the carbon nanotube film 114, not in contact with the two supporters, would be suspended between the two supporters and yet maintain film structural integrity. The free-standing structure of the carbon nanotube film 114 is realized by the successive carbon nanotubes joined end to end by Van der Waals attractive force.

Figure 6:
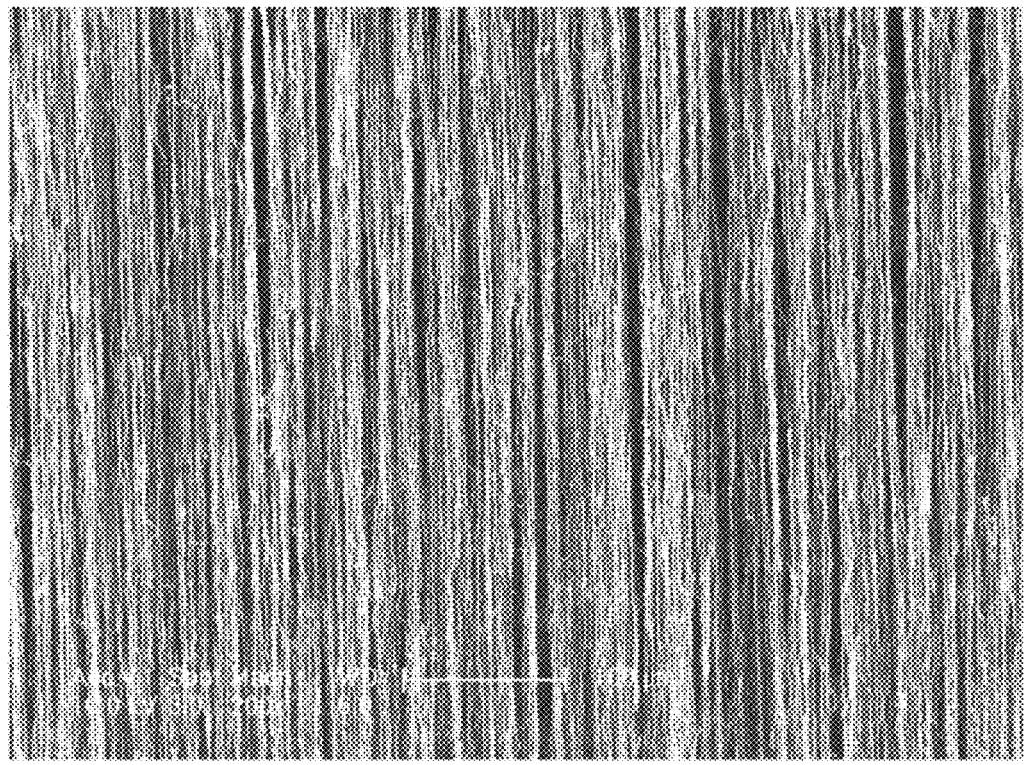
FIG. 6 shows a scanning electron microscope image of a carbon nanotube drawn film of the touch sensor of FIG. 5.

It can be appreciated that some variation can occur in the orientation of the carbon nanotubes in the carbon nanotube film 114 as can be seen in FIG. 6. Microscopically, the carbon nanotubes oriented substantially along the same direction may not be perfectly aligned in a straight line, and some curved portions may exist. It can be understood that some carbon nanotubes located substantially side by side and oriented along the same direction being contact with each other cannot be excluded.

More specifically, the carbon nanotube film 114 comprises a plurality of successively oriented carbon nanotube segments joined end-to-end by Van der Waals attractive force therebetween. Each carbon nanotube segment comprises a plurality of carbon nanotubes substantially parallel to each other, and joined by Van der Waals attractive force therebetween. The carbon nanotube segments can vary in width, thickness, uniformity, and shape. The carbon nanotubes in the carbon nanotube film 114 are also substantially oriented along a preferred orientation.

In one embodiment, the carbon nanotube film 114 can be drawn out from an array of carbon nanotubes. The carbon nanotube film 114 can be formed by selecting one or more carbon nanotubes having a predetermined width from the array of carbon nanotubes, and pulling the carbon nanotubes at a roughly uniform speed to form carbon nanotube segments that are joined end to end to achieve a uniform carbon nanotube film 114.

The carbon nanotube segments can be selected by using a tool, such as adhesive tape, pliers, tweezers, or other tools allowing multiple carbon nanotubes to be gripped and pulled simultaneously to contact with the array of carbon nanotubes. Each carbon nanotube segment comprises a plurality of carbon nanotubes substantially parallel to each other, and combined by Van der Waals attractive force therebetween. The pulling direction can be substantially perpendicular to the growing direction of the array of carbon nanotubes.

The carbon nanotube film 114 has the smallest resistance at the pulling direction, and the largest resistance at a direction substantially perpendicular to the pulling direction. Furthermore, the carbon nanotube film 114 can be irradiated with laser to reduce the thickness of the carbon nanotube film 114. The transparency of the carbon nanotube film 114 can be improved.

The shape of the carbon nanotube film 114 can be rectangle. However, the edges of the carbon nanotube film 114 can be in a shape of curve. The relatively short edges extend along the X direction, and the relatively long edges extend along the Y direction. The plurality of carbon nanotubes substantially along the X direction. The plurality of carbon nanotubes in the carbon nanotube film 114 are attached on the curved surface 1121, and the plurality of carbon nanotubes are oriented along the first curve of the curved surface 1121.

Furthermore, the carbon nanotube film 114 can be attached to the substrate 112 via an adhesive layer (not shown). The adhesive layer can be transparent or opaque. The adhesive layer has low melt point. The thickness of the adhesive layer ranges from about 10 nanometers to about 50 micrometers. The material of adhesive layer can be ultraviolet rays glue, PVC or PMMA.

The plurality of first electrodes 116 and the plurality of second electrodes 118 are located on two opposite sides of the substrate 112. The plurality of first electrodes 116 are spaced from each other and electrically connected to the carbon nanotube film 114. The plurality of first electrodes 116 can be aligned side by side along a curve line. The plurality of second electrodes 118 are spaced with each other and electrically connected to the carbon nanotube film 114. The plurality of second electrodes 118 are also aligned side by side along a curve line.

The plurality of first conductive wires 117 are electrically connected to the plurality of first electrodes 116 and the circuit board 120. The plurality of second conductive wires 119 are electrically connected to the plurality of second electrodes 118 and the circuit board 120.

The material of the first electrode 116, the second electrode 118, the first conductive wire 117, and the second conductive wire 119 can be metal, carbon nanotube, ITO, or conductive paste. The first electrode 116, the second electrode 118, the first conductive wire 117, and the second conductive wire 119 can be formed by etching method or imprinting method. In one embodiment, the material of the first electrode 116 and the second electrode 118 can be tape-shaped conductive paste. The conductive paste comprises metallic powder, low melting point glass powder, and binder. A weight ratio of the metallic powder can range from about 50% to about 90%, a weight ratio of the low melting point can range from about 2% to about 10%, and a weight ratio of the binder can range from about 8% to about 40%.

Figure 7:
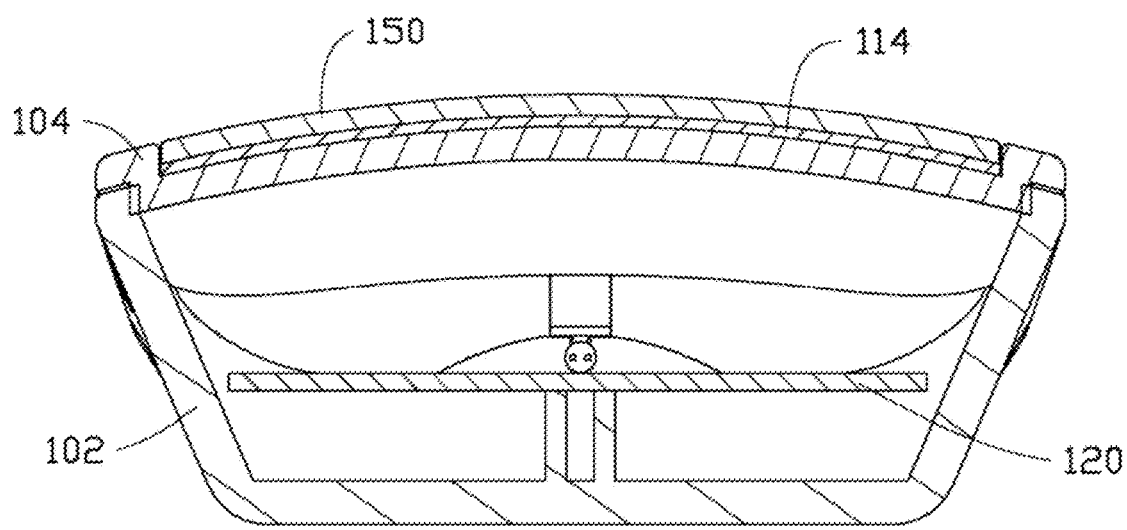
FIG. 7 shows a schematic view of another embodiment of a touch sensor of the remote controller.

Referring to FIG. 7, in one embodiment, the substrate 112 can be omitted from the touching sensor 110, and the carbon nanotube film 114, the first electrode 116, the second electrode 118, the first conductive wire 117, and the second conductive wire 119 can directly located on the inner surface of the cover lens 150. Therefore, the material consumption can be reduced, and the process can be simplified.

Figure 8:
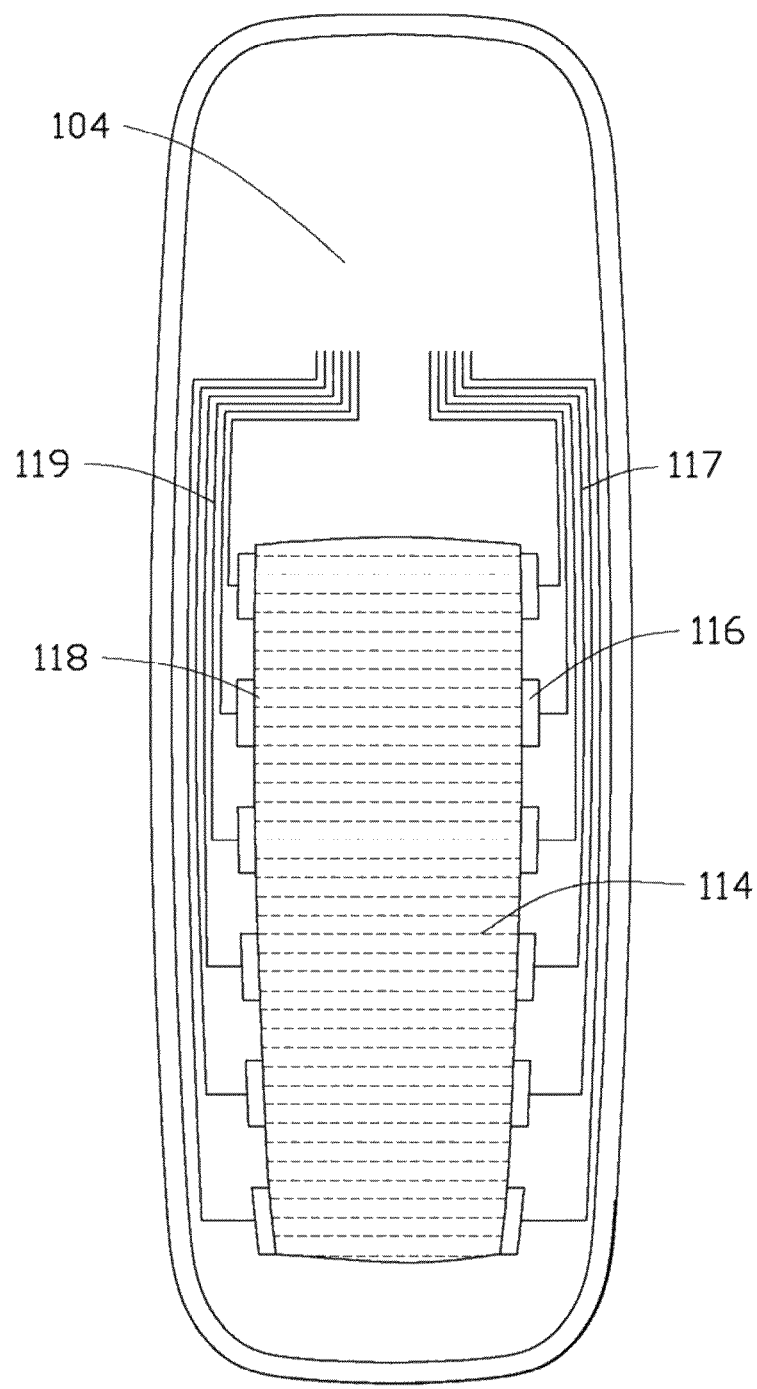
FIG. 8 shows a schematic view of yet another embodiment of a touch sensor of the remote controller.

Referring to FIG. 8, furthermore, the cover lens 150 and the cavity 103 can be omitted, or the cover lens 150 is integrated with the upper case 104 to form an integrated structure. The touching sensor 110 is directly located on the inner surface of the upper case 104. The carbon nanotube film 114 is sandwiched between the inner face of the upper case 104 and the substrate 112.

Furthermore, a display module (not shown) can be attached on the outer surface of the upper case to display information received from the touching sensor 110. The display module can be organic light emitting diode (OLED).

Figure 9:
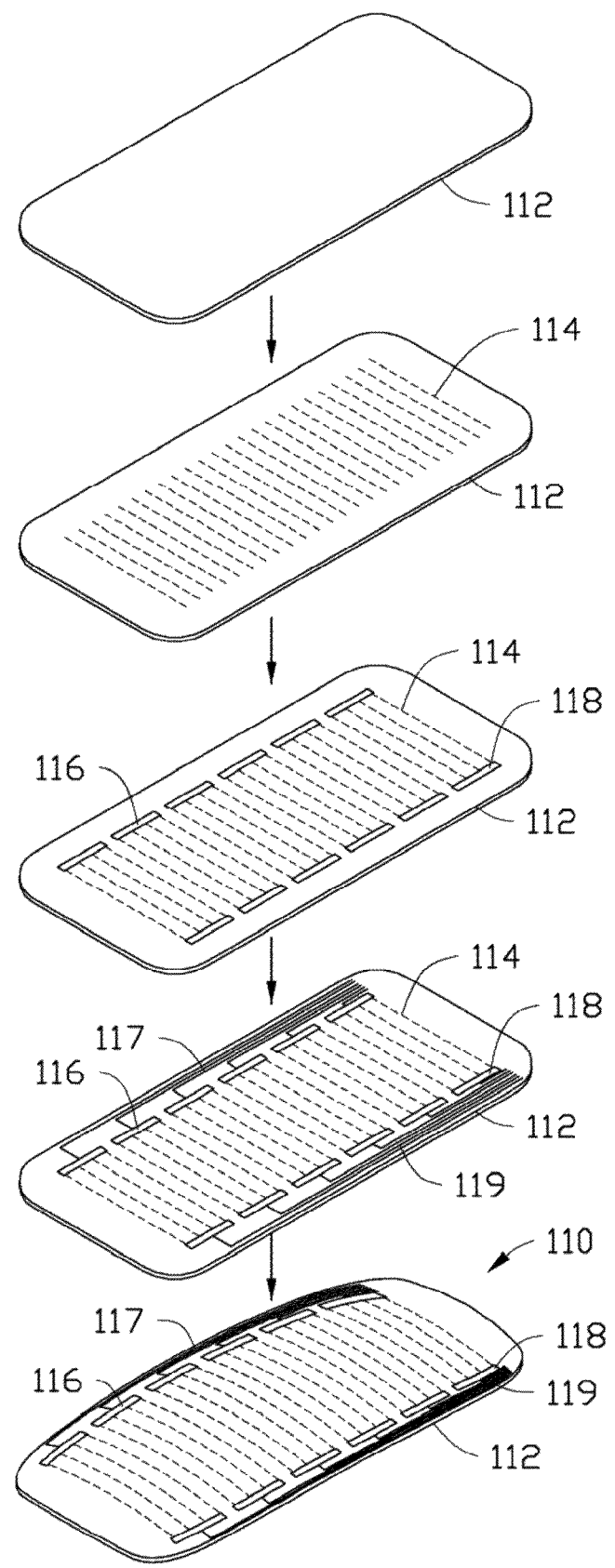
FIG. 9 shows a schematic flow chart of a method for making a touch sensor of FIG. 1.

Referring to FIG. 9, a method for making the touching senor 110 including following steps:

(S10), providing a substrate 112;

(S11), applying a carbon nanotube film 114 on the substrate 112;

(S12), locating a plurality first electrodes 116 and a plurality of second electrodes 118 electrically connected to the carbon nanotube film 114;

(S13), locating a plurality of first conductive wires 117 electrically connected to the plurality of first electrodes 116, and a plurality of second conductive wires 118 electrically connected to the plurality of second electrodes 118; and (S14), bending the carbon nanotube film 114 and the substrate 112 to form the touching sensor 10.

In step (S14), the carbon nanotube film 114 and the substrate 112 can be bent via following substeps:

(S141), providing a die with a female die and a male mold capable of coupling with each other;

(S142), heating the female die and the male mold to a predetermined temperature;

(S143), locating the substrate 112 with the carbon nanotube film 114 between the female die and the male mold;

(S144), compounding the female die and the male mold with each other; and (S145), separating the female die and the male mold.

In step (S142), the predetermined temperature can be selected according to the material of the substrate 112. The substrate 112 can be softened, but the substrate 112 and the carbon nanotube film 114 cannot be destroyed under the predetermined temperature. In one embodiment, the predetermined temperature ranges from about 80 centigrade to about 120 centigrade.

In step (S144), the carbon nanotube film 114 and the substrate 112 is bent according to shapes of the female die and male mold. In one embodiment, the female die comprises a first curved face faced a second curved face of the male mold. Therefore, the carbon nanotube film 114 and the substrate 112 are sandwiched between the first curved surface and the second curved surface. The carbon nanotube film 114 and the substrate 112 forms a curved structure.

The circuit board 120 can be a printing circuit board integrating a plurality of integrated circuits (IC) and circuit. The circuit board 120 is electrically connected to the touching sensor 110 and the signal emitter 130. The circuit board 120 receives and analyzes the touch signals from the touching sensor 110, and controls the signal emitter 130 based on the analysis. Furthermore, a gyroscope (not shown) can be integrated on the circuit board, thus the remote controller 10 has aerial positioning function.

The signal emitter 130 can be infrared transmitter, Bluetooth transmitter, Wifi transmitter, or 2.4 G transmitter. The signals will be transferred to a television and other intelligent terminals to control the work of the intelligent terminals. In one embodiment, the signal emitter 130 comprises an infrared wavelength light emitting diode (LED) 132 and a Bluetooth module 134. The infrared light emitting diode 132 and the Bluetooth module 134 can work together to ensure the correctness of the remote.

The power supply 140 can provide energy to the circuit board 120, the touching sensor 110, and the signal emitter 130. The power supply 140 may be a battery such as a dry battery or lithium secondary battery. In one embodiment, the power supply 140 is a rechargeable lithium battery, so that the size of remote controller 10 can be compacted.

Furthermore, the remote controller 10 can comprise at least one indicator light 160. The indicator light 160 is provided on the upper case 104 and is electrically connected with the circuit board 120. This indicator light 160 is used to display the work mode of the remote controller 10, such as TV remote controller, normal mouse, or Air Mouse. In one embodiment, the indicator light 160 comprises a red LED and a green LED.

The components of the remoter controller 10 listed above can be assembled according to FIG. 2. The upper case 104 can be fixed on the lower case 102 via glue, or melting with ultrasonic.

Figure 10:
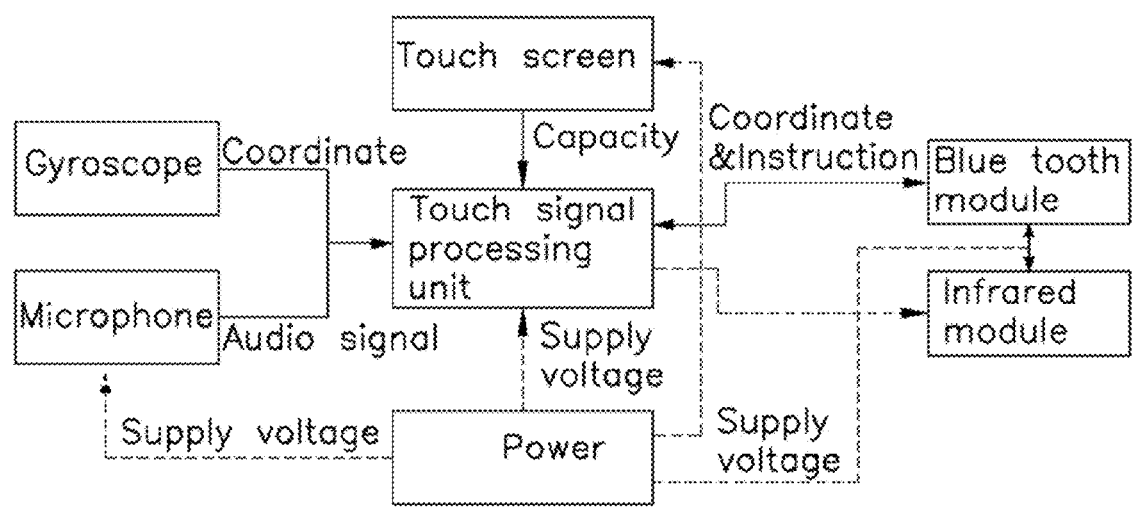
FIG. 10 shows a schematic view of a plurality of modules interconnected with each other in a remote controller.

Referring to FIG. 10, the remote controller 10 comprises a plurality of modules, such as touch screen module, touching signal processing unit, Blue Tooth module, infrared module, power module, microphone, and gyroscope. The touch screen module senses the touch and transferred the touching signal into the touch signal processing unit. The touch signal processing analyzes the touch signal, and sends control signals to other modules, such as outputting instruction to the Bluetooth module to interact with other instruments; outputting a control signal to the microphone to receive voice from the external environment; outputting a control signal to gyroscope and receiving the feedback signal from the gyroscope, converting the feedback signal into working instruction, and transferring the working instruction to the instruments through the Bluetooth module or infrared module.

Figure 11:
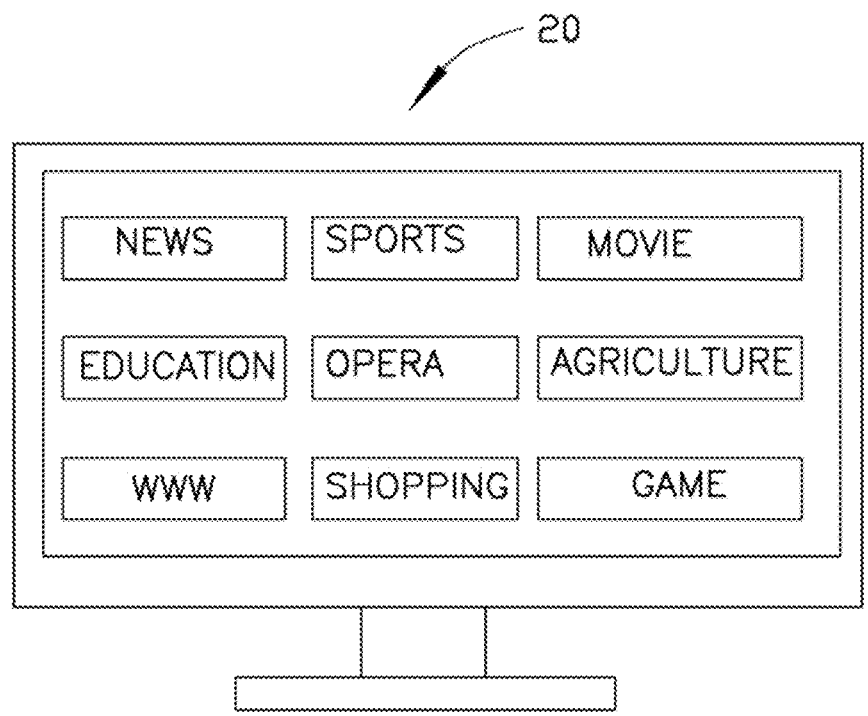
FIG. 11 shows a schematic view of controlling a digital TV with a remote controller of FIG. 1.
Figure 11:
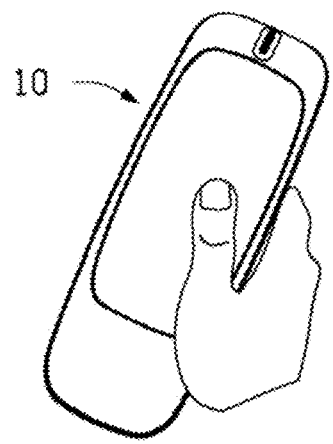

Referring to FIG. 11, the remote controller 10 is capable of working at TV remote controller mode, mouse mode, and air mouse mode. The touching sensor 110 in the remote controller 10 is a multi-point sensing board to identify different predetermined gestures of finger.

In one embodiment, turn on a TV set 20 is defined as drawing a tick with a finger on the touching sensor 110; changing mode is defined as keeping touching on the touching sensor 110 for about 5 seconds; decreasing volume is defined as sliding from the right to the left; increasing volume is defined as sliding from the left to the right; alternating to next channels is defined as upwardly sliding; alternating to the former channels is defined as downward sliding; returning to homepage is defined as drawing a circle on the touching sensor 110; closing the TV set 20 is defined as drawing a cross.

During the remote sensor 10 working under the mouse mode, the remote controller 10 can be connected to the TV set by keep touching on the top of the touching sensor for about 10 seconds. Due to the finger moving on the touching sensor 110, and the cursor on the TV set will move along the movement of the finger. Single click with finger can select menu or objects, and double click can active the objects. While the remote controller 10 is working under the air mouse mode, the remote controller 10 can move in the air, and the cursor can move along the movement of the remote controller 10. Furthermore, a determined channel can be changed by drawing numbers on the touching sensor 110 while the remote sensor is working at TV remote controller mode.

The TV set 20 is turn on to the homepage via the remote controller 10. The TV set 20 displays a plurality of menus. The remoter controller 10 is changed to air mouse mode or mouse mode, and select the menu. While the TV program page is selected, the remote controller 10 can be changed to TV remote controller mode to control the volume and channels. While the web program page is selected, the remote controller 10 can be changed into mouse mode or air mouse mode to browse on the website.

The remote controller has following advantages. First, the touching sensor can be formed by directly located a carbon nanotube film on a substrate, the structure of touching sensor is compacted, and the processing is simplified. Second, the carbon nanotube film is flexible, thus the surface of the substrate can be curved surface such as free-form surface, the design of the substrate can be various. Third, the orientation of the carbon nanotubes in the carbon nanotube film is parallel with the curved direction of the substrate, thus the carbon nanotube film can be bent to an angle at about 90 degrees, and the touch sensing property has not been affected. The application of the remote controller can be used in more areas.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

What is claimed is:

1. A remote controller comprising:
 a case;
 a circuit board, a power supply and a signal emitter accommodated in the case;
 a touch panel attached on the case, wherein the touch panel comprising a curved cover lens and a touch sensor;
 wherein the touch sensor comprises a carbon nanotube film, a plurality of first electrodes and a plurality of second electrodes electrically connected to the carbon nanotube film, and the carbon nanotube film is located on the cover lens, the carbon nanotube film comprises a plurality of carbon nanotubes substantially arranged along an alignment direction and joined along the alignment direction by van der Waals force.

2. The remote controller of claim 1, wherein the curved cover lens is integrally formed in the case.

3. The remote controller of claim 1, wherein a cavity is defined in the case, and the touch panel is fixed in the cavity.

4. The remote controller of claim 3, wherein the case comprises a lower case and an upper case coupled with the lower case, and the cavity is defined in the upper case.

5. The remote controller of claim 4, wherein the cavity and the touching sensor are of a same size and a same shape.

6. The remote controller of claim 5, wherein the touching sensor is embedded and fixed in the cavity.

7. The remote controller of claim 1, wherein the plurality of carbon nanotubes are aligned along a curved direction of the cover lens.

8. The remote controller of claim 7, wherein the alignment direction of the plurality of carbon nanotubes are a generatrix of the cover lens.

9. The remote controller of claim 1, further comprising a substrate, and the carbon nanotube film is located on a surface of the substrate and sandwiched between the cover lens and the substrate.

10. The remote controller of the claim 9, wherein the substrate is a flexible and curved.

11. The remote controller of claim 10, wherein the surface of the substrate is a free-form surface.

12. The remote controller of claim 9, wherein the plurality of first electrodes and the plurality of second electrodes are located on opposite sides of the substrate.

13. The remote controller of claim 1, wherein the carbon nanotube film is anisotropic in electrical impedance.

14. The remote controller of claim 1, wherein the carbon nanotube film is high in electrical impedance in a first direction and low in a second direction, the first direction being perpendicular to the second direction.

15. The remote controller of claim 1, wherein the carbon nanotube film is a free-standing structure.

16. The remote controller of claim 1, wherein an inner surface of the cover lens is a free-form surface.

17. The remote controller of claim 16, wherein the carbon nanotube film is directly attached on an inner surface of the cover lens.

18. A remote controller comprising:
 a touch sensor adapted to sense touch and comprising a substrate and a carbon nanotube film on the substrate, wherein the carbon nanotube film comprises a plurality of carbon nanotubes arranged along an alignment direction, the substrate defines a curved surface, and the carbon nanotube film is attached on the curved surface.

19. The remote controller of claim 18, wherein the curved surface is a free-form surface.

* * * * *